No. 726,793. PATENTED APR. 28, 1903.
L. BEZZERA.
COFFEE MAKING MACHINE.
APPLICATION FILED JUNE 10, 1902.
NO MODEL. 2 SHEETS—SHEET 1.
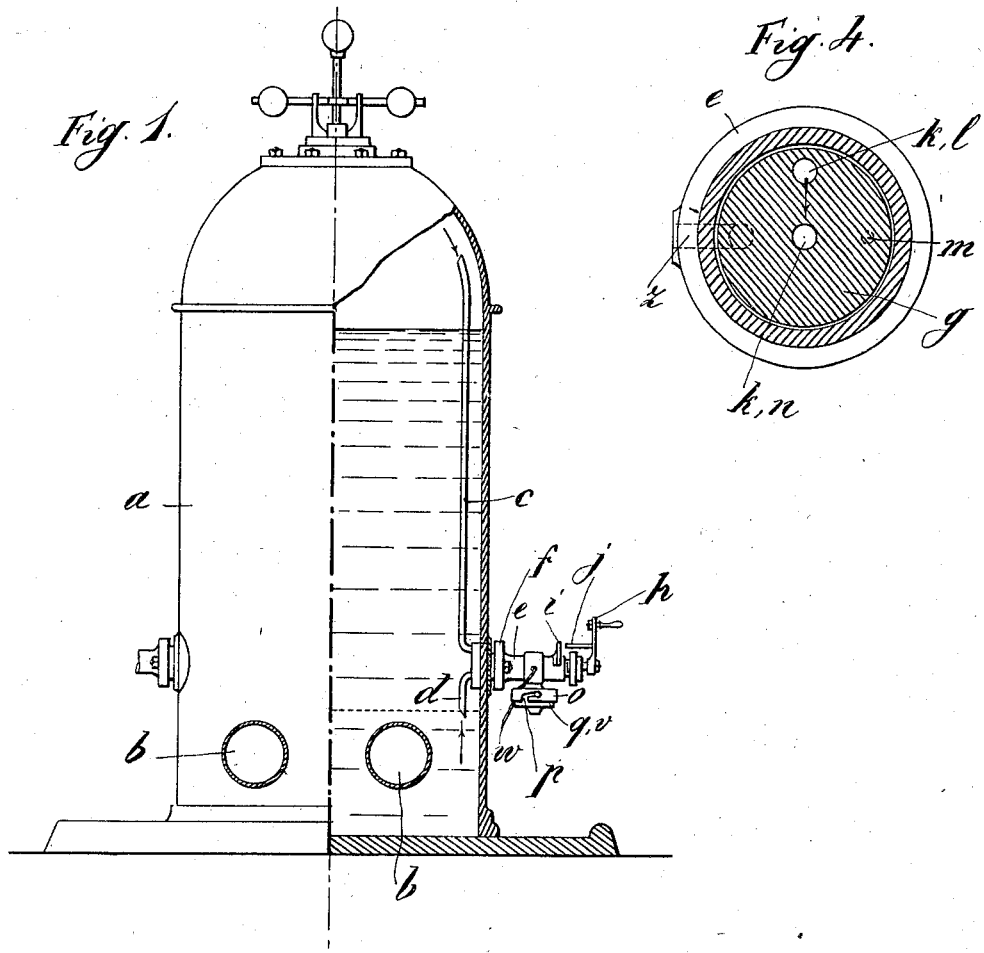
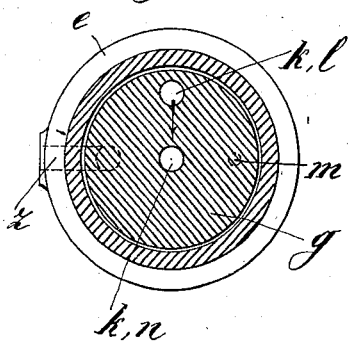
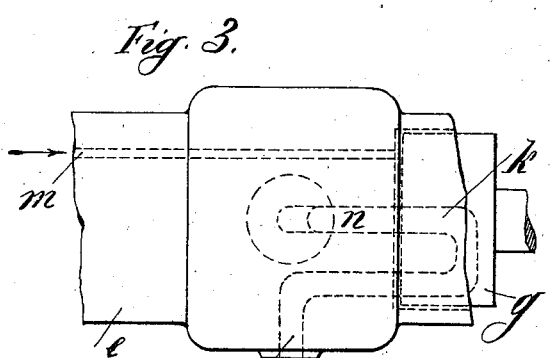
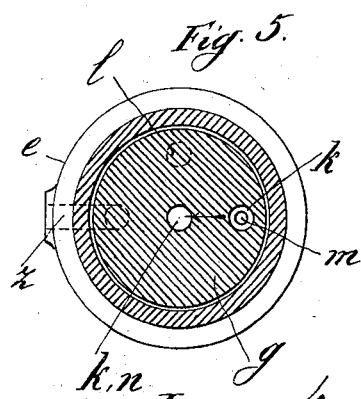
Witnesses: Inventor:
Luigi Bezzera
By Wiedersheim & Fairbanks,
Attorneys

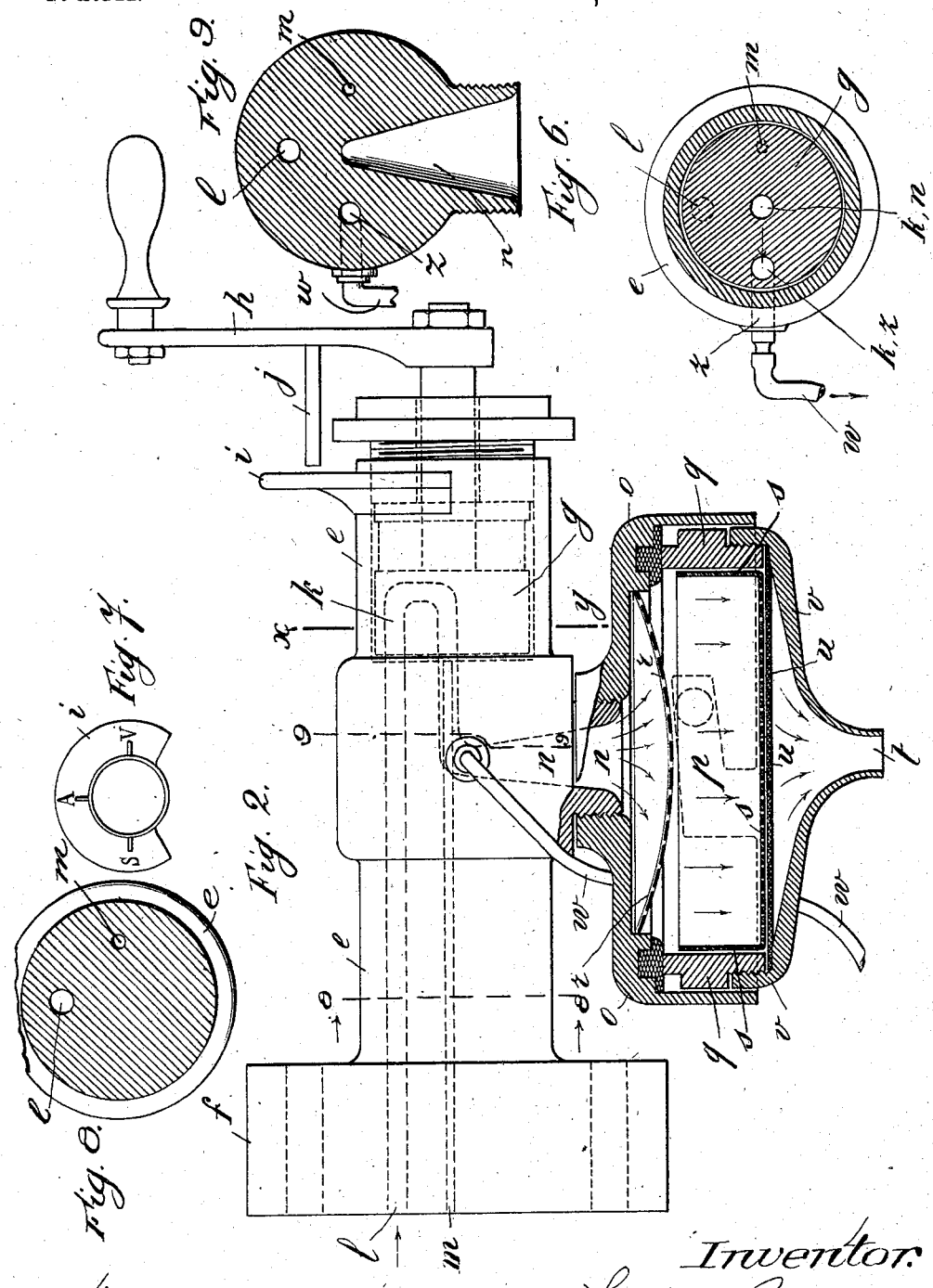

UNITED STATES PATENT OFFICE.

LUIGI BEZZERA, OF MILAN, ITALY, ASSIGNOR TO DESIDERIO PAVONI, OF MILAN, ITALY.

COFFEE-MAKING MACHINE.

SPECIFICATION forming part of Letters Patent No. 726,793, dated April 28, 1903.

Application filed June 10, 1902. Serial No. 111,019. (No model.)

*To all whom it may concern:*

Be it known that I, LUIGI BEZZERA, maker of liquors, a subject of the King of Italy, residing at 13 Via Orso, Milan, in the Kingdom of Italy, have invented certain new and useful Improvements in Coffee-Making Machines, of which the following is a specification.

The improvements in coffee-machines which form the subject of this invention relate, first, to the construction of the furnace or heating portion for the boiler in which the water is converted into steam; secondly, to the position of the mixing and outlet cock, and, thirdly, to the construction of this cock.

The invention will be readily and clearly understood by reference to the accompanying drawings, in which is represented by way of example a constructional form of an appliance of the kind referred to above and including the said improvements.

In the drawings, Figure 1 is a general view of the appliance—that is to say, of the boiler $a$—partly in side elevation and partly in section, provided with horizontal cylindrical chambers $b\ b$, resembling the arrangement of fire-tube boilers, which chambers are adapted to contain the gas-burners or other source of heat. (Not shown.) This view also shows the mixing-cock in side elevation. Fig. 2 is a side elevation, upon a larger scale, of the said cock, including an axial section through the preparing and mixing appliance comprised in the said cock. Fig. 3 is a plan view of a portion of the cock, showing in dotted lines the respective positions of socket and of the plug of the cock at the moment at which the steam in excess is discharged from the preparing and mixing appliance. Figs. 4, 5, and 6 are sections on the line $x\ y$ of Fig. 2, showing three different positions of the plug of this cock corresponding to three distinct phases of the operation of the appliance. Fig. 7 represents an indicator-dial, which is hereinafter described. Fig. 8 is a cross-section on the line 8 8 of Fig. 2. Fig. 9 is a cross-section on the line 9 9 of Fig. 2.

As shown in Fig. 1, the delivery-cock instead of being mounted upon the upper part of the boiler $a$ is arranged in the lower half of the same in such a manner that the boiling water is able to reach the cock even when it is almost exhausted. This is so because it reaches the cock through the tube $d$, while the tube $c$ permits of the escape of the steam which collects at the upper part of the boiler and by the pressure which it exerts serves to force the boiling water into the tube $d$. The position of the burner-chambers $b\ b$ (one burner only may be provided) renders the appliance transportable at will, while with the arrangements hitherto adopted it must be fixed upon the table or counter. The delivery-cock, Fig. 2, comprises a strong metal part $e$, provided with a flange $f$, intended for fixing to the wall of the boiler. The part $e$ is provided in its front portion with a perforated plug $g$, furnished with an operating-handle $h$, and also the closing and packing members, which it is unnecessary to describe. An indicator-dial $i$, Figs. 1, 2, and 7, bears the indications "A," (water,) "V," (steam,) and "S" (exhaust) and serves to guide the person in charge of the apparatus in arranging the plug $g$ in the proper position according to the different phases in the operation of the appliance, an index $j$ being mounted upon the handle $h$ for this purpose, as hereinafter described. The plug $g$, Figs. 2 and 3, dotted lines, is provided with a return-passage $k$, which by means of its peripheral aperture $k\ z$ communicates, according to the position of the plug $g$, either with the water-conduit $l$ or the steam-conduit $m$ or finally with the conduit $z$, serving for the escape of the steam in excess, while by means of its central aperture $k\ n$ it communicates with the angular passage $n$, terminating in a bell-shaped portion which brings the water or steam in contact with the coffee in the form of powder placed in the preparing appliance. The said passages $l\ m\ n$ are all formed in the cock $e$. In the position shown in Figs. 2 and 4 the cock is open in agreement with the indication "A" on the dial $i$—that is to say, in such a manner as to permit of the passage of the boiling water coming from the passage $l$. In the position shown in Fig. 5 it is open for the passage of the steam, and in Fig. 6 the cock is open for the discharge of the steam in excess which may have remained in the preparing appliance after the delivery of the beverage. The arrow shown in Figs. 4, 5, and 6 indicates the radial path of the passage k. The two small circles in dotted lines represent the apertures of the passages l m z, two of which remain closed at once, while the third is open in accordance with the corresponding pause of the operation. When each operation is finished, the cock is of course arranged in such a manner that all three apertures are closed.

I will now describe the preparing and mixing appliance represented in Fig. 2. It consists of a bell o, screwed at its upper portion upon the body e and provided with two bayonet-notches p p, diametrically opposite, one only of which is represented in continuous lines in Fig. 1 and in dotted lines in Fig. 2. The said notches serve for the reception of handles of the cup q, provided with a perforated bottom. By means of these handles the cup q may be inserted in the bell o and withdrawn therefrom at will. The bell o is provided at its upper portion with a perforated diaphragm r. This latter in combination with the bell-shaped portion of the conduit n serves to subdivide the jets of water and steam in such a manner as to distribute them over the entire layer of coffee in the vessel s, which is provided with a finely-perforated bottom, from which the beverage passes to the delivery-aperture t of the closing-cap v, having a curved wall, which is screwed upon the cup q. This arrangement serves to permit of periodical cleansing or replacement of the filter u, of sheet metal, which constitutes the bottom of the cup q, upon which rests the vessel s in such a manner as to facilitate its removal and replacement by another after each cup of coffee has been poured out. This operation is readily effected by first of all detaching the cup q from the bell o by means of the handles with which the said cup may be provided.

The appliance described above differs substantially from the appliances hitherto employed in view of the fact that in these latter there is prepared once for all a quantity of beverage corresponding to a certain number of cups, (fifty, for example,) so that the coffee when poured into the cups is not fresh and does not possess its full aroma except as regards such cups as are served immediately after the preparation of the beverage. By means of my appliance, on the other hand, the quantity of coffee necessary for a single cup is prepared separately, so that fresh coffee is always served. The proportion of the mixture is determined by the size of the cup q and by the quantity of coffee placed in the vessel s with perforated bottom. After each cup has been poured out the vessel s may be removed and replaced by another, a supply of these vessels being always kept in a drawer ready charged with the proper quantity of coffee.

As when a cup has been poured out and the lower movable portion of the mixing appliance has been removed in order to replace the vessel containing the coffee-powder the steam remaining in the appliance would produce inconvenient jets, the exhaust-tube w, Figs. 2 and 6, having a certain inclination, is screwed to the outer wall of the body e of the apparatus, and an angular passage z, Figs. 3, 4, 5, and 6, formed in the part e and opening into the said tube, is also provided. In this manner an exhaust-pipe is obtained which is opened only when the communication of the conduit n with the water and steam admission conduits is interrupted—that is to say, after the pouring out of each cup. The tube w permits of the escape into the atmosphere of the steam above the conduit n and the mixing appliance without the production of jets or else permits of its being conducted elsewhere for discharge in the form of water of condensation, if desired. In order to effect this, it is only necessary to turn the plug g in such a manner that the aperture of the conduit k is opposite the opening of the conduit z, Figs. 3 and 6.

The operation of the apparatus is obvious from the foregoing description to any person conversant with these appliances, so that no further explations are necessary.

It is obvious that the constructional details of the apparatus may be varied without exceeding the limits of my invention.

What I claim, and desire to secure by Letters Patent of the United States, is—

1. In a machine for the purpose described, a boiler provided with a transverse heating-chamber in its lower portion and a delivery-cock near the lower portion of the boiler having a bell-shaped discharge-conduit, a coffee-receptacle, a perforated diaphragm situated between the discharge-nozzle of the delivery-cock and the coffee-receptacle, and a tube connected with said cock and extended downward within the boiler, as and for the purpose specified.

2. In a machine for the purpose described, a boiler provided with a transverse heating-chamber in its lower portion and a delivery-cock near the lower portion of the boiler having a bell-shaped discharge-conduit, a coffee-receptacle, a perforated diaphragm situated between the discharge-nozzle of the delivery-cock and the coffee-receptacle, a tube connected with said cock and extended downward within the boiler, and a pipe connecting said cock with the steam-space of the boiler, as and for the purpose specified.

3. In a coffee-making machine, a boiler provided in its lower portion with tubular heating-chambers extending through the water-space thereof, a delivery-cock connected with the lower portion of said boiler and having a bell-shaped discharge-conduit, a coffee-receptacle, a perforated diaphragm situated between the discharge-nozzle of the delivery-cock and the coffee-receptacle, and means for the escape of steam above the said conduit to prevent the production of jets.

4. In a coffee-making machine, the combination with a boiler having heating-chambers extending through the lower portion thereof, of a cock connected to the lower portion of said boiler, a preparing and mixing appliance connected therewith and disposed beneath the same, a bell-shaped conduit between said cock and appliance, and a pipe leading from said cock for the escape of steam, substantially as described.

5. In a coffee-making machine, the combination of a boiler and cock connected to the lower portion thereof, said cock having a bell-shaped discharge-conduit, a preparing and mixing appliance connected with said conduit, diaphragms and filters in said appliance, a detachable cap having a delivery-spout, and an exhaust-tube from said cock for the escape of the steam.

6. In a device of the character described, the combination with a cock having a bell-shaped conduit extending therefrom, of a bell mounted on said conduit, a cup supported within said bell, a perforated diaphragm, a vessel having reticulated bottom, a filter disposed beneath said vessel, and a closing-cap having a curved wall and delivery-aperture in line with said conduit, all substantially as and for the purpose specified.

In testimony whereof I have hereunto set my hand, in presence of two subscribing witnesses, this 28th day of May, 1902.

LUIGI BEZZERA.

Witnesses:
H. P. SMITH,
NIDE DRAGO.